(12) United States Patent
Wang et al.

(10) Patent No.: US 12,731,711 B2
(45) Date of Patent: Sep. 8, 2026

(54) SOFT MAGNETIC COMPOSITE WITH TWO-DIMENSIONAL MAGNETIC MOMENT AND HIGH WORKING FREQUENCY BAND, AND PREPARATION METHOD THEREFOR

(71) Applicants: GUANGZHOU NEWLIFE MAGNET ELECTRICITY CO., LTD., Guangdong (CN); LANZHOU UNIVERSITY, Gansu (CN)

(72) Inventors: Xiaoming Wang, Guangzhou (CN); Zheng Yang, Guangzhou (CN); Fashen Li, Lanzhou (CN); Chunsheng Guo, Guangzhou (CN); Liang Qiao, Lanzhou (CN); Tao Wang, Guangzhou (CN)

(73) Assignee: GUANGZHOU NEWLIFE NEW MATERIAL CO., LTD.

( * ) Notice: Subject to any disclaimer, the term of this patent is extended or adjusted under 35 U.S.C. 154(b) by 1655 days.

(21) Appl. No.: 17/055,630

(22) PCT Filed: Sep. 29, 2019

(86) PCT No.: PCT/CN2019/108896

§ 371 (c)(1),
(2) Date: Nov. 16, 2020

(87) PCT Pub. No.: WO2020/140506

PCT Pub. Date: Jul. 9, 2020

(65) Prior Publication Data

US 2021/0225568 A1 Jul. 22, 2021

(30) Foreign Application Priority Data

Jan. 2, 2019 (CN) ......................... 201910000894.7

(51) Int. Cl.

| | |
|---|---|
| ***H01F 1/36*** | (2006.01) |
| ***C08K 3/08*** | (2006.01) |
| ***C08K 3/22*** | (2006.01) |
| ***C08K 7/18*** | (2006.01) |
| ***C08L 75/04*** | (2006.01) |
| ***H01B 3/30*** | (2006.01) |

(52) U.S. Cl.
CPC ................. *H01F 1/36* (2013.01); *C08K 3/08* (2013.01); *C08K 3/22* (2013.01); *C08K 7/18* (2013.01);

(Continued)

(58) Field of Classification Search
CPC ..... H01F 1/16; H01F 1/18; H01F 1/20; H01F 1/22; H01F 1/26; H01F 1/28;

(Continued)

(56) References Cited

U.S. PATENT DOCUMENTS 7,561,114 B2 * 7/2009 Maezawa .................. H01F 1/28 428/447
2010/0068512 A1 3/2010 Imaoka (Continued)

FOREIGN PATENT DOCUMENTS

| | | |
|---|---|---|
| CN | 101699577 A | 4/2010 |
| JP | 2017059816 | 3/2017 |
| WO | WO2008136391 | 11/2008 |

OTHER PUBLICATIONS

Isnard. Investigation of the magnetic properties of Nd2Fe17 and Nd2Fe17Hx (x=3, 4.9) in high magnetic field. J. Appl. Phys. 87, 5326-5328 (2000) (Year: 2000).*

(Continued)

*Primary Examiner* — Matthew E. Hoban
(74) *Attorney, Agent, or Firm* — RADLO & SU

(57) ABSTRACT

The present disclosure relates to a soft magnetic composite with a two-dimensional magnetic moment and a high working frequency band, and a preparation method therefor. According to an embodiment, the soft magnetic composite with a two-dimensional magnetic moment may comprise: an insulating matrix; and two-dimensional magnetic moment micropowder dispersed in the insulating matrix, wherein inside the two-dimensional magnetic moment micropowder, (Continued)

a magnetic moment is distributed in a specific two-dimensional plane. The soft magnetic composite with a two-dimensional magnetic moment of the present disclosure has a higher cut-off frequency than existing materials, and therefore can be widely applied in the field of high frequency microwave application.

10 Claims, 7 Drawing Sheets

(52) U.S. Cl.
CPC ................ *C08L 75/04* (2013.01); *H01B 3/30* (2013.01); *C08K 2003/0856* (2013.01); *C08K 2003/2265* (2013.01)

(58) Field of Classification Search
CPC ............. H01F 1/14791; H01F 1/14766; H01F 1/14775; H05K 9/0073; H05K 9/0075; H05K 9/0081; H05K 9/0083
See application file for complete search history.

(56) References Cited

U.S. PATENT DOCUMENTS

2011/0186771 A1* 8/2011 Hussain ............... H05K 9/0083 252/62.51 R
2017/0076845 A1 3/2017 Suetsuna
2017/0179376 A1 6/2017 Riken

OTHER PUBLICATIONS

Li. Enhanced Microwave Absorption of Flake-Oriented Sendust Sheets by Tape Casting. IEEE Transactions on Magnetics, vol. 51, No. 11, Nov. 2015 (Year: 2015).*
English translation of the Abstract of Foreign Patent Application, CN101699577.
First Search Report of Prior Application CN2019100008947, China.
Mangui Han, Difei Liang, Jianliang Xie, and Longjiang Deng, Effect of Attrition Time on the Microwave Permeability of Magnetic Fe—Si—Al Flakes, AIP Journal of Applied Physics, Sep. 3, 2012.
Mangui Han, Wei Tang, Wenbing Chen, Hao Zhou, and Longjiang Deng, Effect of Shape of Fe Particles on Their Electromagnetic Properties within 1-18 GHZ Range, AIP Journal of Applied Physics, American Institute of Physics, 2010.
Sang Woo Kima, Y.W. Yoon, S.J. Lee, G.Y. Kim, Y.B. Kim, Yun Yeo Chun, K.S. Lee, Electromagnetic Shielding Properties of Soft Magnetic Powder-Polymer Composite Films for the Application to Suppress Noise in the Radio Frequency Range, ScienceDirect, Journal of Magnetism and Magnetic Materials, 2007.
R. B. Yang and W. F. Liang, Microwave Absorbing Characteristics of Flake-shaped Fenimo Epoxy Composites, Journal of Applied Physics, American Institute of Physics, 2013.
English translation of the Japanese office action, JPA2020-571819, Jul. 18, 2023.
Japanese office action, JPA2020-571819, Jul. 18, 2023.

* cited by examiner

100

SOFT MAGNETIC COMPOSITE WITH TWO-DIMENSIONAL MAGNETIC MOMENT AND HIGH WORKING FREQUENCY BAND, AND PREPARATION METHOD THEREFOR

TECHNICAL FIELD

The present disclosure generally relates to the field of a magnetic material, and in particular, relates to a soft magnetic composite with a two-dimensional magnetic moment (or a soft magnetic composite composed of two-dimensional magnetic moment micropowder, or a two-dimensional magnetic moment soft magnetic composite, 2DMM-SMC), which has higher operating (or working) frequencies and thus obtains excellent magnetic properties in higher frequency and microwave frequency bands.

BACKGROUND

The basic function of soft magnetic materials operating at different frequencies is to convert electromagnetic energy or electromagnetic signals, and the conversion efficiency thereof is proportional to the product of magnetization and an operating frequency of the material. A laminated silicon steel sheet and a soft magnetic ferrite are two types of traditional soft magnetic core materials. The silicon steel sheet has high saturation magnetization, but as the frequency increases, an eddy current loss increases sharply, therefore, the silicon steel sheet can only operate at a lower frequency, generally below 1 KHz. The ferrite core has good high-frequency magnetic properties, an operating frequency up to about 10 MHz, a large resistivity, and a low eddy current loss, but it has a disadvantage of a low magnetic flux density leading to low conversion efficiency. These two kinds of traditional soft magnetic materials have encountered difficulties in the miniaturization of AC equipment.

It is an important task to optimize the power conversion efficiency of a soft magnetic device and to further realize the miniaturization, light weight of magnetic devices by improving the magnetization and the operating frequency of the soft magnetic materials. In view of the problems existing in the traditional laminated silicon steel sheet and soft magnetic ferrite, a soft magnetic composite (SMC) has been proposed, which includes soft magnetic material micropowder (generally Fe, FeSiAl, FeNi, etc.) dispersed in a matrix of organic or inorganic insulating material. The soft magnetic composite has a higher operating frequency than the laminated silicon steel sheet, for example, it can be up to about 100 KHz, and the soft magnetic composite has higher saturation magnetization than the soft magnetic ferrite, thus it has been widely used today in many fields.

Theoretical research shows that all of soft magnetic micropowder composing of widely used soft magnetic composites by mass produced today obey the Snoek limit, which is expressed by a following formula 1:

$$(\mu_i - 1) f_r = \frac{2}{3} \gamma' M_s \quad \text{(formula 1)}$$

where $\mu_i$ is initial magnetic permeability, $f_r$ is a natural resonance frequency (also known as a cut-off frequency), $\gamma'$ is a gyromagnetic ratio, and Ms is saturation magnetization. Due to the limitation of the Snoek limit, the operating frequency of current soft magnetic composites can only be below 100 KHz-200 KHz, which hinders the application of soft magnetic composite in the field of higher frequency and microwave bands.

SUMMARY

An aspect of the present disclosure is to provide a soft magnetic composite with a two-dimensional magnetic moment, and a preparation method therefor. The soft magnetic composite with a two-dimensional magnetic moment can break through the Snoek limit, thus can be applied in higher frequency bands, and contribute to realize the miniaturization, light weight and efficient power conversion of devices.

According to an embodiment, the disclosure provides a soft magnetic composite with a two-dimensional magnetic moment, comprising an insulating matrix; and two-dimensional magnetic moment micropowder (or micropowder having a two-dimensional magnetic moment configuration) dispersed in the insulating matrix, wherein inside the two-dimensional magnetic moment micropowder, magnetic moments are distributed in specific two-dimensional planes.

In some examples, the two-dimensional magnetic moment micropowder comprises at least one of artificial two-dimensional magnetic moment micropowder and intrinsic two-dimensional magnetic moment micropowder.

In some examples, the artificial two-dimensional magnetic moment micropowder has a cubic crystalline structure; and the intrinsic two-dimensional magnetic moment micropowder has a non-cubic crystalline structure whose easy magnetization axes are perpendicular to a C axis.

In some examples, the artificial two-dimensional magnetic moment micropowder has a size of 20 μm or less and preferably 15 μm or less, a thickness of 500 nm or less and preferably 100 nm or less, and a diameter-to-thickness ratio in a range of 40 to 200 and preferably a range of 50 to 150.

In some examples, the intrinsic two-dimensional magnetic moment micropowder has a size of 10 μm or less, preferably 5 μm or less.

In some examples, the artificial two-dimensional magnetic moment micropowder comprises at least one of following materials: Fe; carbonyl iron; an alloy made of Fe and at least one of Co and Ni; FeSiAl, and FeNiMo.

In some examples, the intrinsic two-dimensional magnetic moment micropowder comprises one or more of following materials: $R_2(Fe,Ni,Si,Al)_{17}N_3$, where R is Y, Ce, Nd or Pr; $Sm_2(Fe,Ni,Co)_{14}B$; $R_2(Co,Fe,Ni)_{17}$, where R is Y or Nd.

In some examples, the insulating matrix comprises at least one of thermoplastic resin, thermosetting resin, and synthetic rubber.

In some examples, the two-dimensional magnetic moment micropowder is oriented in the insulating matrix such that the magnetic moments of the two-dimensional magnetic moment micropowder are distributed in the two-dimensional planes.

According to an embodiment, the disclose provides an electronic device, comprising a circuit; and an insulating magnetic component disposed immediately adjacent to the circuit, wherein the insulating magnetic component is made of the above-mentioned soft magnetic composite with a two-dimensional magnetic moment.

In some examples, the electronic device is one of an inducter, an antenna, a microwave isolater, a microwave circulater, a phase shifter, a filter, and a transformer.

According to an embodiment, the disclosure provides a method for preparing a soft magnetic composite with a two-dimensional magnetic moment, comprising: preparing two-dimensional magnetic moment micropowder, inside which the magnetic moments are distributed in specific two-dimensional planes; uniformly dispersing the prepared two-dimensional magnetic moment micropowder in an insulating matrix; and curing the insulating matrix.

In some examples, the method further comprises: before curing the insulating matrix, using an external magnetic field to make the magnetic moments of the two-dimensional magnetic moment micropowder in the insulating matrix to orientate in two-dimensional planes generated by the external magnetic field.

The soft magnetic composite with a two-dimensional magnetic moment disclosed by the present disclosure can break through the Snoek limit of traditional soft magnetic composites, has good magnetic properties even in higher frequency and microwave frequency bands, and is suitable for mass production, accordingly, it has a broad application prospect.

DETAILED DESCRIPTION

Figure 1:
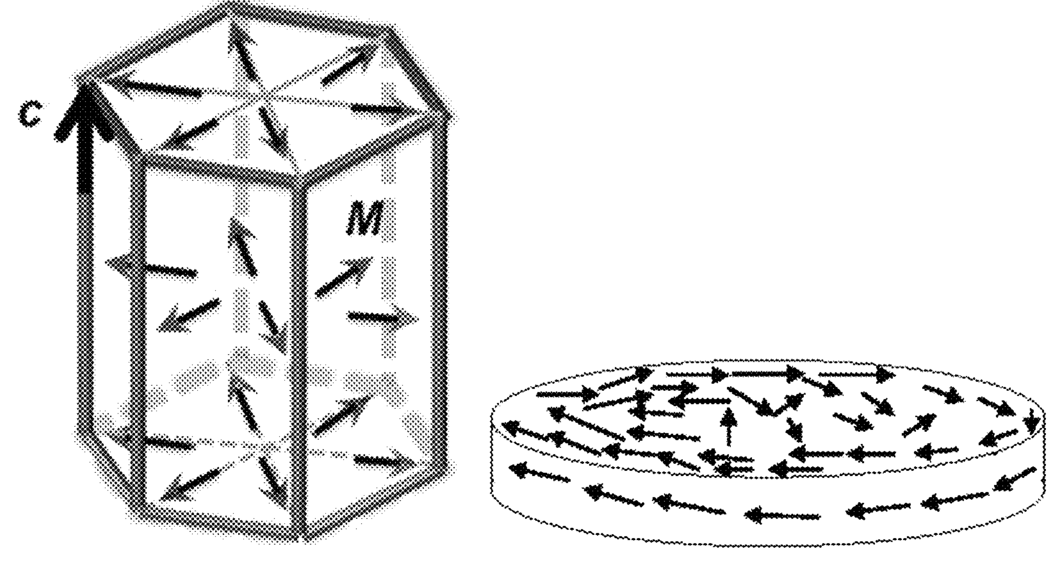
FIG. 1 shows a magnetic moment configuration in a crystalline cell of intrinsic two-dimensional magnetic moment micropowder (left) and magnetic moments configuration in artificial two-dimensional magnetic moment micropowder (right) according to an embodiment of the present disclosure.

Hereinafter, exemplary embodiments of the present disclosure will be described by referring to the drawings.

Figure 2:
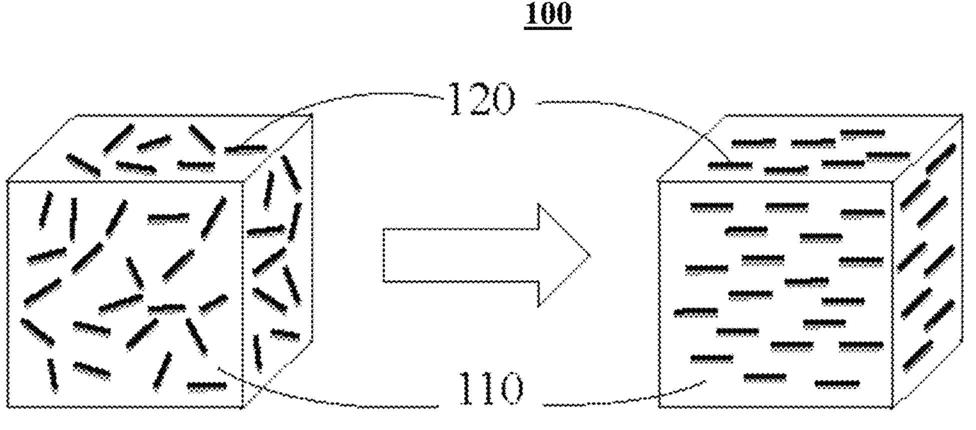
FIG. 2 shows a schematic diagram of a spatial distribution of magnetic moments of micropowder in a two-dimensional magnetic moment composite according to an embodiment of the present disclosure before orientation under an external magnetic field (left) and after orientation under an external magnetic field (right).

FIG. 1 shows a magnetic moment configuration in a crystalline cell of intrinsic two-dimensional magnetic moment micropowder (left) and a magnetic moment distribution in artificial two-dimensional magnetic moment micropowder (right) according to an embodiment of the present disclosure, and FIG. 2 shows a schematic arrangement of two-dimensional magnetic moment micropowder in a two-dimensional magnetic composite according to an embodiment of the present disclosure before orientation under an external magnetic field (left) and after orientation under an external magnetic field (right). As shown in FIG. 1 and FIG. 2, a soft magnetic composite with a two-dimensional magnetic moment 100 may include an insulating matrix 110 and two-dimensional magnetic moment micropowder 120 dispersed in the insulating matrix 110.

The insulating matrix 110 can be an insulating matrix used in conventional soft magnetic composites, and is generally an organic insulating material, for example, an organic polymer adhesive such as thermoplastic resin, thermosetting resin, synthetic rubber, and the like, examples of which may include, but are not limited to, polyurethane, polyimide, etc.

The two-dimensional magnetic moment micropowder 120 is dispersed and fixed in the insulating matrix 110, thus the soft magnetic composite with a two-dimensional magnetic moment 100 is an electrically insulating magnetic material. In the soft magnetic composite with a two-dimensional magnetic moment 100 of the present disclosure, magnetic moments of the two-dimensional magnetic moment micropowder 120 is constrained in specific two-dimensional planes in the magnetic powder by a certain "acting forces" therein. It should be understood that the soft magnetic composite with a two-dimensional magnetic moment itself may be in a variety of physical forms, for example, a form of thin film, a form of three-dimensional bulk, such as a cube and a rectangular bulk, and the like. For any form of the soft magnetic composite with a two-dimensional magnetic moment, the magnetic moments of the two-dimensional magnetic moment micropowder 120 are all in the specific two-dimensional planes in the magnetic powder.

In some embodiments of the present disclosure, the two-dimensional magnetic moment micropowder 120 may include at least one of two types of micropowder, namely, artificial two-dimensional magnetic moment micropowder and intrinsic two-dimensional magnetic moment micropowder, as shown in the right view and left view in FIG. 1, respectively. As the names imply, the intrinsic two-dimensional magnetic moment micropowder is a material intrinsically having a two-dimensional magnetic moment configuration, while the artificial two-dimensional magnetic moment micropowder is a material with a two-dimensional magnetic moment arrangement through manual processing, which will be described in detail below.

The intrinsic two-dimensional magnetic moment micropowder may include a micropowder of a soft magnetic material having a non-cubic crystalline structure, and all of easy magnetization axes (abbr. "easy axes") of the soft magnetic material are perpendicular to a C axis of the crystalline structure. For the magnetic materials having a non-cubic crystal structure, for example, certain rare earth-3D transition intermetallic compounds with a non-cubic crystalline structure and some non-cubic crystalline structure ferromagnetic alloys, they have a strong magnetocrystalline anisotropy, whose magnetocrystalline anisotropy constant $K_1$ has a large absolute value, but a negative value. For such a kind of materials with $K_1<0$, all of the easy axes thereof are perpendicular to the C axis, and the magnetic moments are orientated along the specific crystalline planes, such as a hexagonal plane, a C plane, and the like, thus forming the two-dimensional magnetic moment configuration. Both radial (or in-plane) anisotropy field $H_{xy}$ and normal (or out-of-plane) anisotropy field $H_z$ of such material are originated from the magnetocrystalline anisotropy of the material itself, so it is called the intrinsic two-dimensional magnetic moment micropowder.

Some non-limiting examples of intrinsic two-dimensional magnetic moment micropowder include: $R_2(Fe,Ni,Si,Al)_{17}N_3$, where R is Y, Ce, Nd or Pr; $Sm_2(Fe,Ni,Co)_{14}B$; $R_2(Co, Ni, Fe)_{17}$, where R is Y or Nd, and the like. There is no special restriction on a shape of the intrinsic two-dimensional magnetic moment micropowder, which can be, for example, generally spherical particles, and can also be flaky or the like, and no matter what shape it is, the magnetic moment thereof is distributed along a specific crystalline plane, such as a hexagonal plane, a C plane and the like, so as to form the two-dimensional magnetic moment configuration. In general, a size of the intrinsic two-dimensional magnetic moment micropowder can be 10 μm or less, and preferably 5 μm or less. It should be understood that when the size of the micropowder is mentioned herein, it generally refers to the size in the maximum length direction of micropowder, unless it is otherwise stated.

Figure 3:
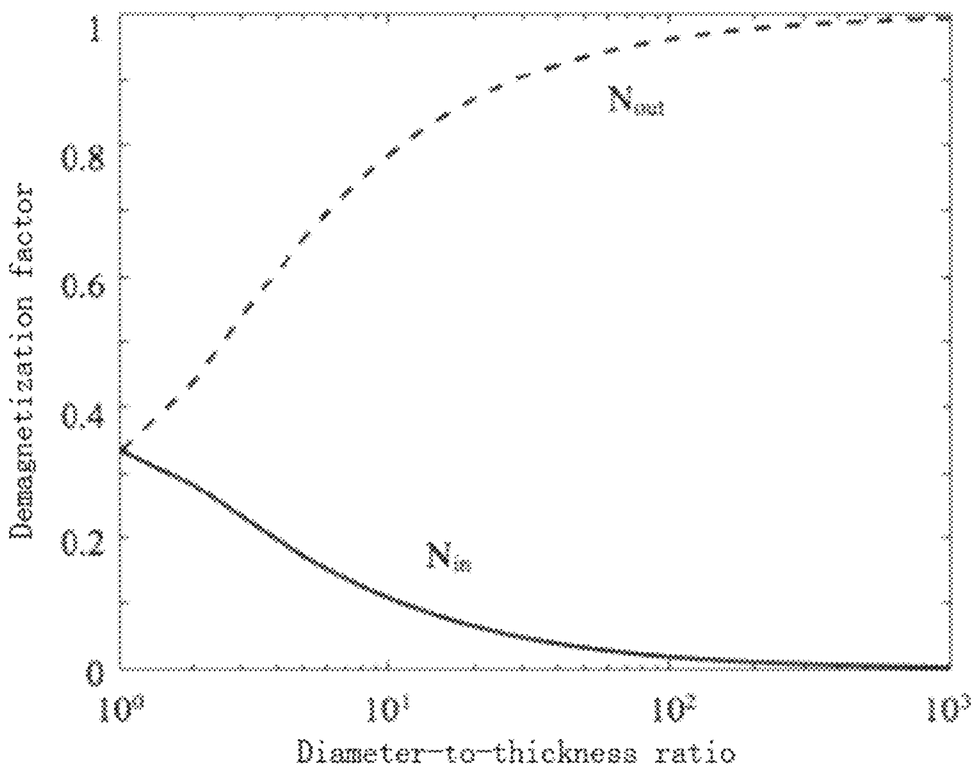
FIG. 3 shows the dependence of demagnetization factors on diameter-to-thickness ratios.

The artificial two-dimensional magnetic moment micropowder may include metallic and alloying soft magnetic materials, both having a cubic crystalline structure. For the soft magnetic material having a cubic crystalline structure, the magnetocrystalline anisotropy energy is small. In an embodiment of the present disclosure, the two-dimensional magnetic moment configuration can be obtained by processing this type of material into a magnetic powder with a high diameter-to-thickness ratio. FIG. 3 shows the dependence of a demagnetization factor on the diameter-to-thickness ratio. As shown in FIG. 3, as the diameter-to-thickness ratio increases, a normal (out-of-plane) demagnetization factor $N_{out}$ continuously increases and finally approaches to 1, while an in-plane demagnetization factor $N_{in}$ continuously decreases and finally approaches to 0. When the normal demagnetization factor $N_{out}$ is close to 1, and the in-plane demagnetization factor $N_{in}$ (for example, a X-direction demagnetization factor $N_x$ and a Y-direction demagnetization factor $N_y$) is close to zero, the magnetic moments in the micropowder are distributed in the XY plane thereof, forming the two-dimensional magnetic moment configuration. The out-of-plane (or normal) anisotropy field $H_z$ comes from a demagnetization field, and the in-plane (or radial) anisotropy fields $H_{xy}$ comes from the magneto-crystalline anisotropy field of the material itself. This type of powder is referred to as the artificial two-dimensional magnetic moment micropowder, since the two-dimensional magnetic moment configuration in the powder have to be produced by artificial processing into a particular shape.

Some non-limiting examples of the artificial two-dimensional magnetic moment micropowder include: Fe; carbonyl iron; an alloy composed of Fe and at least one of Co and Ni; FeSiAl; FeNiMo and the like. The diameter-to-thickness ratio of the artificial two-dimensional magnetic moment micropowder can be in a range of 40 to 200, and preferably in a range of 50 to 150. As mentioned above, the larger the diameter-to-thickness ratio is, the more beneficial to the formation of the two-dimensional magnetic moment configuration is. Therefore, preferably, a substantially good two-dimensional magnetic moment structure can be realized when the diameter-to-thickness ratio is greater than 50. However, to produce micropowder with a larger diameter-to-thickness ratio may lead to a cost and complicated preparation process. Therefore, the diameter-to-thickness ratio can be 200 or less, preferably 150 or less, and more preferably 100 or less. In addition, a size of the artificial two-dimensional magnetic moment micropowder can be 20 μm or less, preferably 15 μm or less, and a thickness of the artificial two-dimensional magnetic moment micropowder can be 500 nm or less, preferably 300 nm or less.

For the two-dimensional magnetic moment soft magnetic micropowder as mentioned above, a following formula 2 may be obtained through theoretical analysis:

$$(\mu_i-1)f_r=\frac{2}{3}\gamma' M_s\sqrt{\frac{H_z}{H_{xy}}} \quad \text{(formula 2)}$$

where, $\mu_i$ is initial magnetic permeability, $f_r$ is a natural resonance frequency, $\gamma'$ is a gyromagnetic ratio, Ms is saturation magnetization, $H_z$ is an out-of-plane anisotropy field, and $H_{xy}$ is an in-plane anisotropy field. As mentioned above, the out-of-plane anisotropy field $H_z$ is much larger than the in-plane anisotropy field $H_{xy}$, generally in three orders of magnitude, accordingly, when the external magnetic field is zero, the magnetic moments of the two-dimensional magnetic moment micropowder are distributed in specific planes; when the external magnetic field is not zero, the magnetic moment makes a rotation or precession motion in (or along) the planes under the action of an external magnetic field. It is such a precession motion along the two-dimensional magnetic moment planes that greatly increases the cut-off frequency (or the natural resonance frequency) of the micropowder, thus the micropowder can be operate in the high frequency and microwave bands. In some embodiments, and in order to further improve the magnetic permeability, as shown in FIG. 2, all magnetic powder can be orientated by an externally applied rotating magnetic field or a multi-pole magnetic field, accordingly, the two-dimensional magnetic moments of all magnetic micropowder are orientated in the two-dimensional planes determined by the rotating magnetic field, thus, the magnetic permeability of the two-dimensional magnetic moment soft magnetic composite in the external field orientation planes is greatly improved compared to that of the unorientated composite material, which can be increased by 1.5 times theoretically, and it's a magnetic property of isotropic in the orientation plane.

Figure 4:
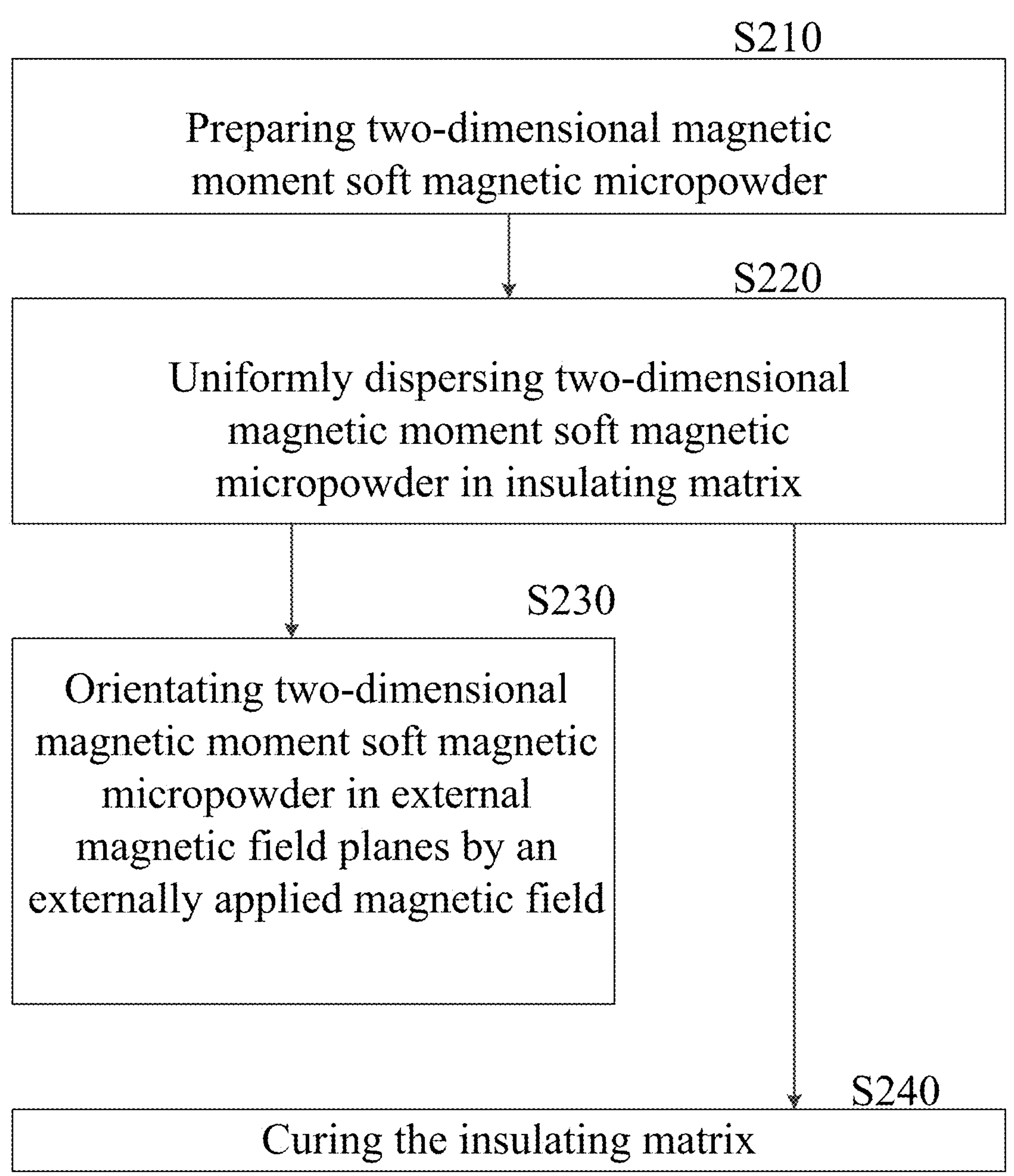
FIG. 4 shows a flow chart of a method for preparing a soft magnetic composite with a two-dimensional magnetic moment according to an embodiment of the present disclosure.

A method for preparing the soft magnetic composite with a two-dimensional magnetic moment 100 according to an embodiment of the present disclosure is described below with reference to FIG. 4. As shown in FIG. 4, a method 200 may start at step S210 for preparing the two-dimensional magnetic moment micropowder 120.

For the intrinsic two-dimensional magnetic moment micropowder, because there is no requirement on the shape of the micropowder, such as the diameter-to-thickness ratio, the preparation steps of the micropowder are relatively simple. For example, the initial powder can be prepared by using a conventional method, such as a quick setting method, a smelting ingot crushing method, a reduction-diffusion method, and the like, or it can be directly purchased, and then it is processed by a high energy ball mill or a sand mill to be refined to 10 μm or less, and preferably 5 μm or less.

For the artificial two-dimensional magnetic moment micropowder, iron powder, carbonyl iron powder, FeSiAl powder, FeNi powder, etc. with a size less than 5-20 μm, can be prepared via for example, a gas atomization, a water atomization method, etc., or can be purchased directly, and then the magnetic powder is processed using a high energy ball mill or a sand mill, and through optimizing the grinding process, the diameter-to-thickness ratios of most of obtained micropowder are more than 40 and preferably more than 50, the thickness thereof are less than 500 nm and preferably less than 300 nm. It should be understood that adjusting the diameter-to-thickness ratio by optimizing the ball milling process is known for those skilled in the relevant art and will not be described again herein.

Then in step S220, the prepared two-dimensional magnetic moment micropowder 120 can be uniformly dispersed in the insulating matrix 110, such as a polymer binder and the like, which can be realized by, for example, mixing and stirring steps.

Next, in step S230, all of the two-dimensional magnetic moment micropowder 120 in the insulating matrix 110 can be orientated by using an externally applied orientation magnetic field. For example, through a rotating magnetic field, a multi-pole magnetic field and the like, the two-dimensional magnetic moment micropowder 120 can be orientated in two-dimensional planes generated by the external field. It should be understood that in step S230, since the two-dimensional magnetic moment micropowder 120 may slowly rotate in the organic insulating matrix 110 with appropriate viscosity, through the orientation step S230, the easy magnetization planes of all of the micropowder 120 may be orientated in the two-dimensional planes generated by the external field.

Finally, in step S240, the insulating matrix may be cured to obtain a definite shape, and the two-dimensional magnetic moment soft magnetic micropowder 120 is fixed in the insulating matrix 110. According to the material of the insulating matrix 110, corresponding curing means, such as heating, ultraviolet irradiation, pressurization, natural curing, and the like, can be used.

In some embodiments, according to the actual needs, step S240 can be directly performed without the orientation step S230, and the two-dimensional magnetic moment soft magnetic composite having a desired shape, such as a bulk, a column, a thin film and the like, may be prepared through a lot of processes, such as calendering, molding, extrusion, injection, or tape casting, etc. Of course, it can be understood that it is preferred to perform step S230, because the magnetic permeability of the two-dimensional magnetic moment soft magnetic composite can be improved.

It can be understood from the above description that the "two-dimensional magnetic moment" in the present disclosure can be understood at two levels. Firstly, inside the powder, the magnetic moments are distributed in the two-dimensional planes, which can increase the natural resonance frequency of the material, thus the material can operate at a higher frequency band, such as a high frequency band and a microwave band etc. Secondly, in the soft magnetic composite, the magnetic moments of all of the micropowder can be orientated in a plurality of two-dimensional planes parallel with each other, such that the magnetic permeability is increased. However, it should be understood that the second point is an alternative one rather than an essential one.

Some examples of the soft magnetic composite composed of two-dimensional magnetic moment micropowder of the present disclosure are described as follows.

Example 1

The raw powder before ball milling processed are commercially available carbonyl iron powder, whose model is MCIP-4 and whose size is 4 to 5 microns. The carbonyl iron powder is grinded by the high energy ball mill or sand mill to obtain the two-dimensional magnetic moment micropowder having a high diameter-to-thickness ratio. The micropowder is uniformly mixed with the polyurethane under a volume concentration 65% for the magnetic powder, orientated in the rotating magnetic field (2 T), and compacted with unidirectional pressure of 3 MPa, then a specimen is obtained.

Figure 5:
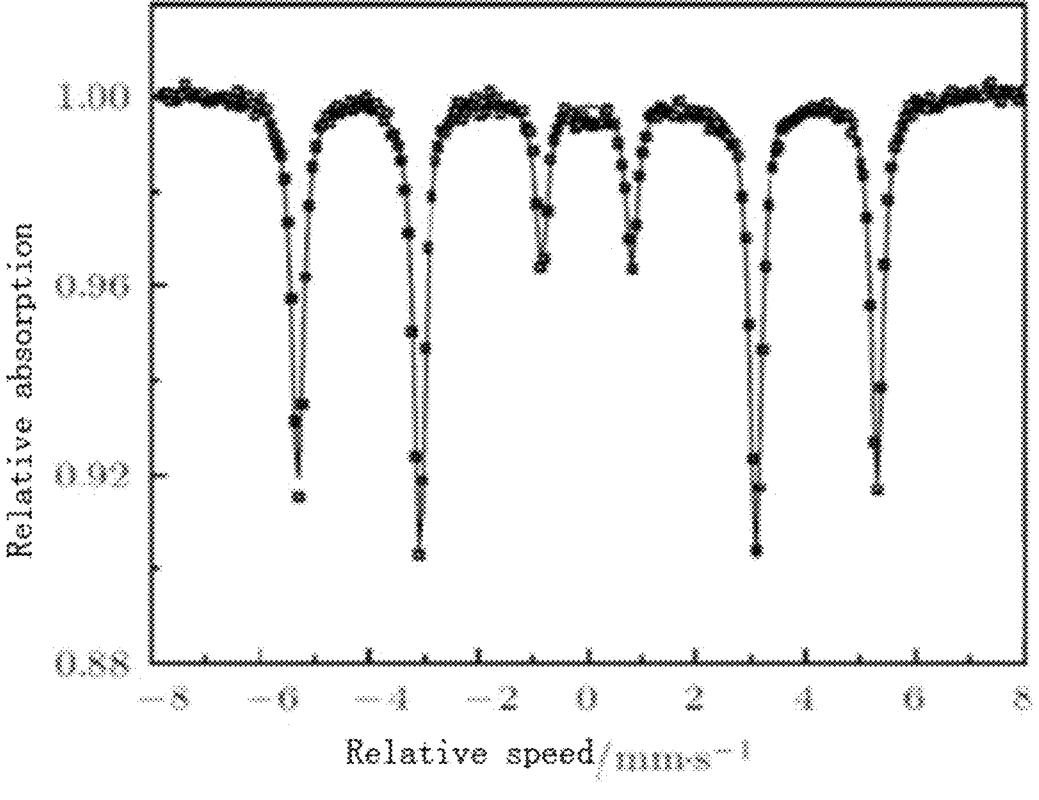
FIG. 5 shows a $Fe^{57}$ Moessbauer spectrogram of a soft magnetic composite with a two-dimensional magnetic moment prepared according to an embodiment of the present disclosure.
Figure 6:
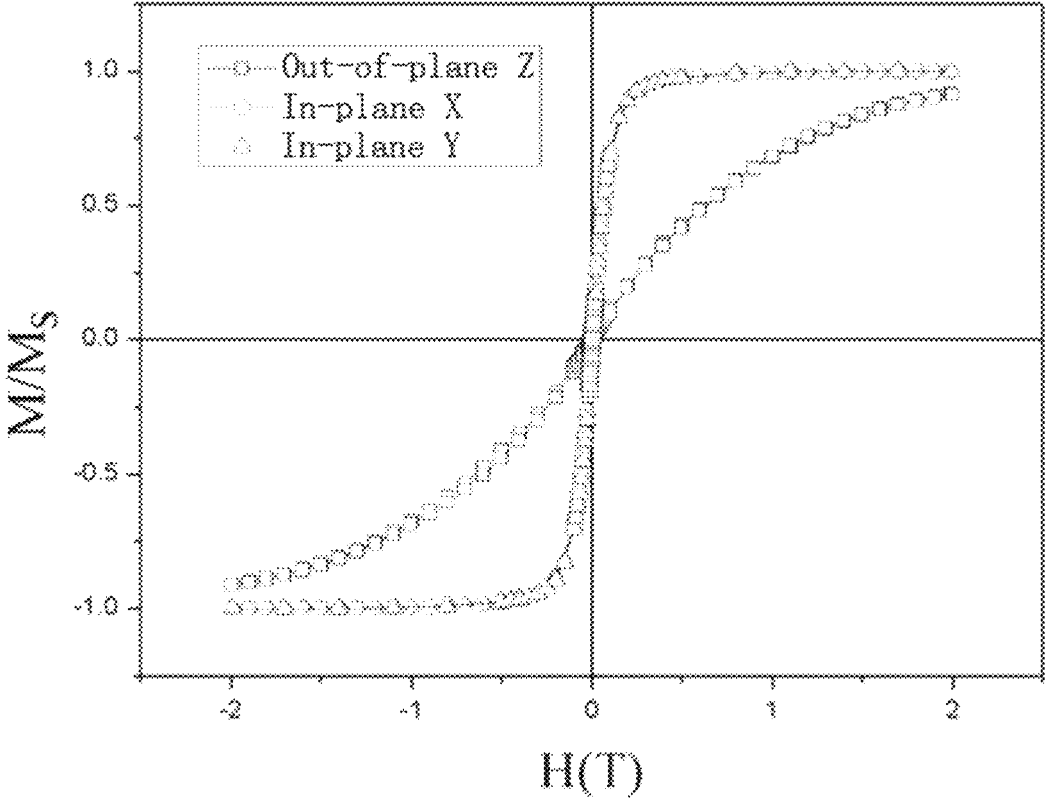
FIG. 6 is measurement results of magnetic hysteresis loop of the soft magnetic composite with a two-dimensional magnetic moment of FIG. 5.
Figure 7A:
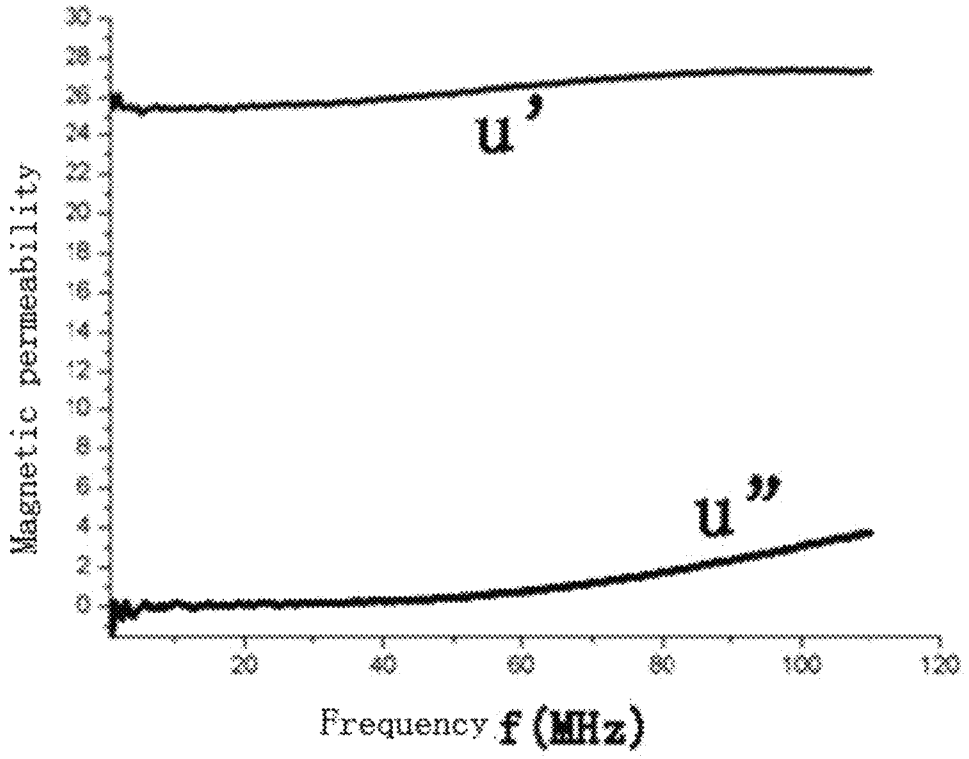
FIG. 7A and FIG. 7B are magnetic spectrum of the soft magnetic composite with a two-dimensional magnetic moment of FIG. 5 in different frequency bands.
Figure 7B:
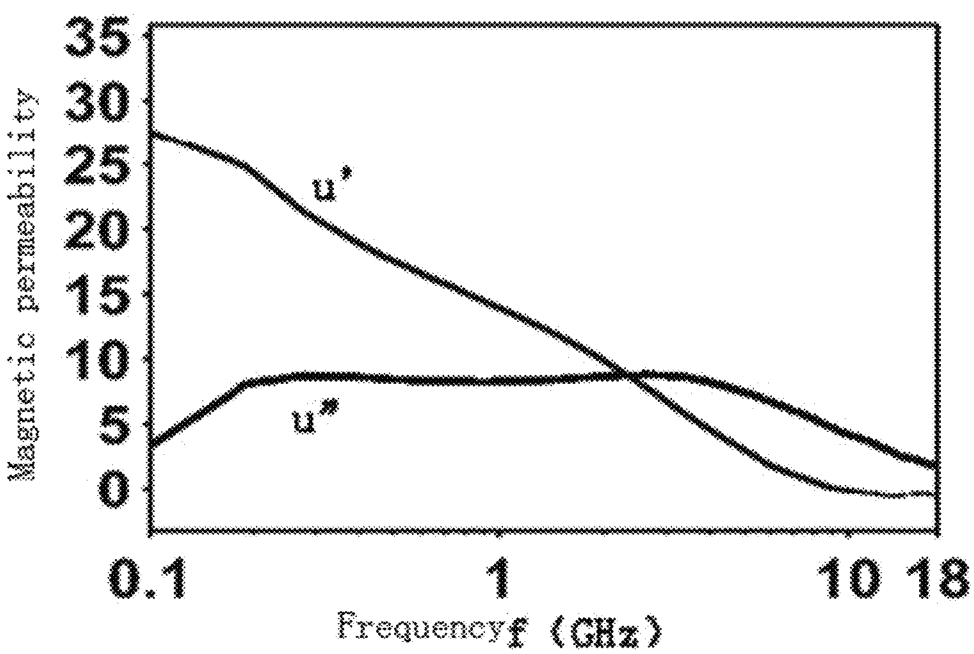

FIG. 5 shows a $Fe^{57}$ Moessbauer spectrogram of the specimen, the data in which shows that the plane orientation degree of the magnetic moments of the composite specimen obtained by the present disclosure is superior over 95%. FIG. 6 shows magnetic hysteresis loop measurement results of the specimen in three directions X, Y and Z performed by a vibration specimen magnetometer (VSM), which indicates that the specimen is easier to be magnetized and isotropic in the XY plane and the plane orientation degree of the magnetic moment of the specimen is superior over 95%. FIG. 7A and FIG. 7B show magnetic spectrums of the two-dimensional magnetic moment soft magnetic composite shown in FIG. 5 in different frequency bands, wherein the frequency band shown in FIG. 7A is 1-110 MHz, and the frequency band shown in FIG. 7B is 0.1-18 GHz. The following Table 1 shows real component μ', imaginary component μ" and Q values at several specific frequency points in a 10-110 MHz frequency band. It can be seen that the two-dimensional magnetic moment soft magnetic composite for Example 1 may operate well in a high frequency range of 1-100 MHz, and the corresponding real component of the magnetic permeability are about 25-27 and the corresponding Q values are 181-9.

TABLE 1

| Frequency | 10 MHz | 20 MHz | 30 MHz | 40 MHz | 50 MHz | 60 MHz | 80 MHz | 100 MHz |
|---|---|---|---|---|---|---|---|---|
| μ | 25.46-0.14i | 25.55-0.15i | 25.73-0.23i | 25.92-0.27i | 26.21-0.44i | 26.57-0.78i | 27.15-1.74i | 27.36-3.06i |
| Q | 181 | 167 | 112 | 95 | 59 | 34 | 16 | 9 |

Example 2

For a two-dimensional magnetic moment soft magnetic composite FeNi, the raw powder before ball milling processed is commercially available iron-nickel powder, and its size is 15-20 microns. The two-dimensional magnetic moment micropowder with a diameter-to-thickness ratio of 30-50 is obtained by using a high energy ball mill or sand mill under an optimized ball milling condition. The two-dimensional magnetic moment micropowder FeNi is mixed with the polyurethane under a volume concentration 30% for the magnetic powder, and compacted in a rotating magnetic field (2 T) with a unidirectional pressure of 3 MPa, and then a specimen is obtained.

The $Fe^{57}$ Moessbauer spectroscopy measurement and the vibration specimen magnetometer measurement are also performed on this specimen, and the measurement results (not shown) indicate that the specimen is easier to be magnetized and isotropic in the XY plane, and the plane orientation degree of the magnetic moments of the specimen is superior over 95%. Magnetic spectrum measurement has also been performed on the specimen in the frequency band of 1-110 MHz and in the frequency band of 0.1-18 GHz, and the following Table 2 shows real component μ' and imaginary component μ" and Q values at several specific frequency points in the 1-110 MHz frequency band. It can be seen that the two-dimensional magnetic moment soft magnetic composite for Example 2 can work well in a high frequency range of 1-100 MHz, and the corresponding real component of magnetic permeability are about 25, and the corresponding Q values are 283-4.

TABLE 2

| Frequency | 1 MHz | 20 MHz | 40 MHz | 80 MHz | 100 MHz | 110 MHz |
|---|---|---|---|---|---|---|
| μ | 25.5-0.09i | 24.6-0.37i | 25.2-0.98i | 25.77-3.86i | 25.15-5.57i | 24.61-6.29i |
| Q | 283 | 66 | 26 | 7 | 5 | 4 |

Example 3

For a two-dimensional magnetic moment soft magnetic composite NdFeN, two-dimensional magnetic moment micropowder $Nd_2Fe_{17}N_{3-\delta}$ is obtained by nitriding spherical micropowder $Nd_2Fe_{17}$ which are prepared by reduction-diffusion method. The two-dimensional magnetic moment micropowder with proper sizes is obtained by optimizing the ball milling process. A specimen of the composite is obtained by uniformly mixing the micropowder with the polyurethane under a volume concentration 65% for the magnetic powder, orientating in a rotating magnetic field or a multi-pole magnetic field (2 T), and compacting (the unidirectional pressure is 3 MPa).

Figure 8:
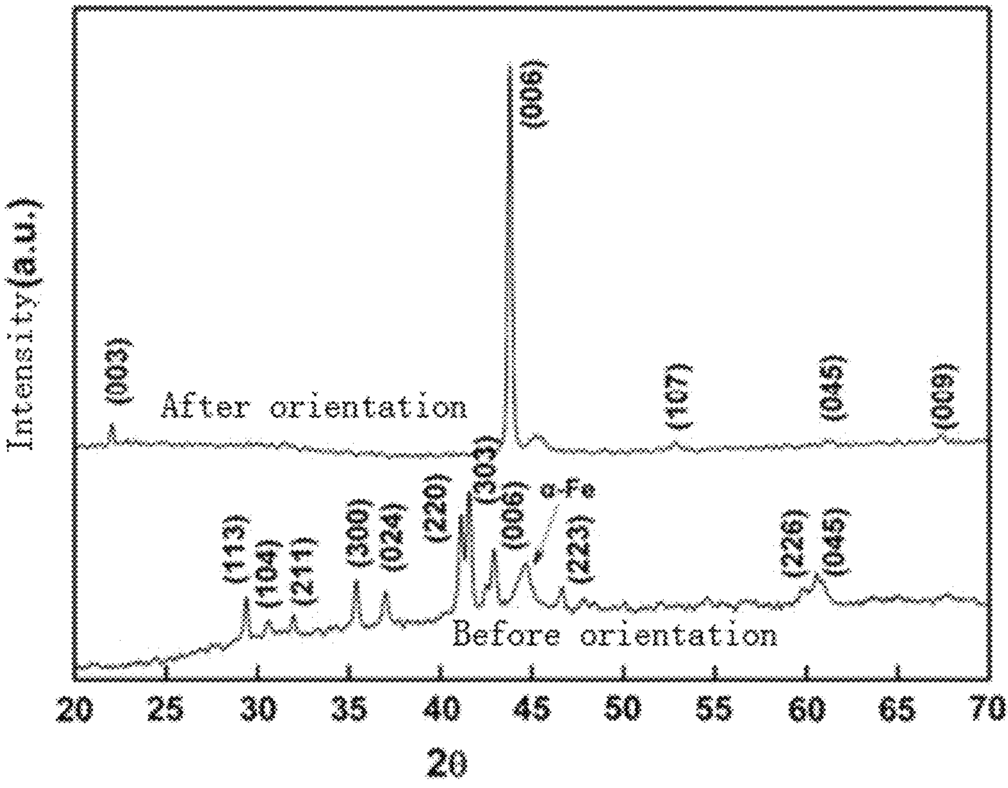
FIG. 8 shows an XRD spectrogram of a soft magnetic composite with a two-dimensional magnetic moment according to an embodiment of the present disclosure before orientation under an external magnetic field and after orientation under an external magnetic field.

The XRD measurement has been performed on the two-dimensional magnetic moment soft magnetic composite NdFeN for Example 3 before the orientation under an external magnetic field and after the orientation under an external magnetic field, and the measurement results are shown in FIG. 8. It can be seen from FIG. 8 that a peak (006) after the orientation is obviously enhanced, and the calculation indicates that the magnetic moment plane orientation degree of the two-dimensional magnetic moment soft magnetic composite $Nd_2Fe_{17}N_{3-\delta}$ is superior over 95%, which is also consistent with the measurement results of the Moessbauer spectroscopy measurement and the vibration sample magnetometer. In addition, magnetic spectroscopy measurement has also been performed on the specimen in the frequency bands of 1-110 MHz and 0.1-18 GHz, and the following Table 3 shows the magnetic permeability and Q values at several specific frequency points in a frequency range of 1 MHz to 10 GHz. It can be seen that the operating frequency of the two-dimensional magnetic moment soft magnetic composite for Example 3 can be up to about 10 GHz, and the corresponding magnetic permeability is about 7.5-2. There is a lot of room for improvement on the high frequency permeability of the soft magnetic composite through the optimization of the preparation process.

TABLE 3

| Frequency | 1 MHz | 100 MHz | 500 MHz | 1 GHz | 1.5 GHZ | 2 GHz | 5 GHz | 10 GHz |
|---|---|---|---|---|---|---|---|---|
| μ | 7.6 | 5.7 | 5.2 | 4.1 | 3.6 | 3.4 | 2.7 | 2.1 |
| Q | 6 | 5 | 2.5 | 2.3 | 2.3 | 2.3 | 2.1 | 1.8 |

The two-dimensional magnetic moment soft magnetic composite and the preparation method therefor according to some embodiments of the present disclosure are described above. It should be understood that the two-dimensional magnetic moment soft magnetic composite of the present disclosure can be applied to various devices, especially devices operating at high frequency and microwave bands. Therefore, some embodiments of the present disclosure also provide an electronic device comprising a circuit and an insulating magnetic component disposed immediately adjacent to the circuit. For example, depending on different electronic devices, the circuit may be a coil, a resonant circuit, etc., and the insulating magnetic component disposed immediately adjacent to the circuit may be a core body or the like, which may be made of the two-dimensional magnetic moment soft magnetic composite according to embodiments of the present disclosure. Examples of such electronic devices include, but are not limited to, inducters, antennas, microwave isolaters, microwave circulaters, phase shifters, filters, transformers, and the like. Since the structures of these devices are known, their description will not be repeated here. In other embodiments of the present disclosure, electronic equipment including these electronic devices are also provided.

The above description has been presented for purposes of illustration and description. Furthermore, this description is not intended to limit the embodiments of the present disclosure to the form disclosed herein. Although various example aspects and embodiments have already been discussed above, those skilled in the art will recognize certain variations, modifications, changes, additions, and sub-combinations thereof.

What is claimed is:

1. A soft magnetic composite with a two-dimensional magnetic moment, comprising:

an insulating matrix; and two-dimensional magnetic moment micropowder dispersed in the insulating matrix, wherein inside the two-dimensional magnetic moment micropowder, magnetic moments are isotropically distributed in specific two-dimensional planes in the two dimensional magnetic moment micropowder, wherein when an external operating magnetic field is zero, the magnetic moments of the two-dimensional magnetic moment micropowder are distributed in the specific two-dimensional planes in the two-dimensional magnetic moment micropowder, when the external operating magnetic field is not zero, the magnetic moment makes a rotation or precession motion in or along the specific two-dimensional planes under an action of the external operating magnetic field;

wherein the two-dimensional magnetic moment micropowder dispersed in the insulating matrix is orientated by a multi-pole external orientation magnetic field or a rotating eternal orientation magnetic field to enable easy magnetization planes of the two-dimensional magnetic moment micropowder in the soft magnetic composite to be distributed in two-dimensional planes determined by the multi-pole external orientation magnetic field or the rotating external orientation magnetic field and a plane orientation degree of the soft magnetic composite is superior over 95%.

2. The soft magnetic composite with a two-dimensional magnetic moment of claim 1, wherein the two-dimensional magnetic moment micropowder include at least one of artificial two-dimensional magnetic moment micropowder and intrinsic two-dimensional magnetic moment micropowder.

3. The soft magnetic composite with a two-dimensional magnetic moment of claim 2, wherein the artificial two-dimensional magnetic moment micropowder has a cubic crystalline structure, and wherein the intrinsic two-dimensional magnetic moment micropowder has a non-cubic crystalline structure, and easy magnetization axes of the intrinsic two-dimensional magnetic moment micropowder are perpendicular to a C axis.

4. The soft magnetic composite with a two-dimensional magnetic moment of claim 3, wherein the artificial two-dimensional magnetic moment micropowder has a size of 20 μm or less, a thickness of 500 nm or less, and a diameter-to-thickness ratio in a range of 40 to 200, and wherein the intrinsic two-dimensional magnetic moment micropowder has a size of 10 μm or less.

5. The soft magnetic composite with a two-dimensional magnetic moment of claim 2, wherein the artificial two-dimensional magnetic moment micropowder includes one or more from a group composed of Fe; a carbonyl iron; an alloy composed of Fe with at least one of Co and Ni; FeSiAl; and FeNiMo, and wherein the intrinsic two-dimensional magnetic moment micropowder includes one or more of following materials: $R_2(Fe, Ni, Si, Al)_{17}N_3$, where R is Y, Ce, Nd or Pr; $Sm_2(Fe, Ni, Co)_{14}B$; $R_2(Co, Fe, Ni)_{17}$, where R is Y or Nd.

6. The soft magnetic composite with a two-dimensional magnetic moment of claim 1, wherein the insulating matrix includes at least one of thermoplastic resin, thermosetting resin, and synthetic rubber.

7. The soft magnetic composite with a two-dimensional magnetic moment of claim 4, wherein the artificial two-dimensional magnetic moment micropowder has a size of 15 μm or less.

8. The soft magnetic composite with a two-dimensional magnetic moment of claim 4, wherein the artificial two-dimensional magnetic moment micropowder has a thickness of 100 nm or less.

9. The soft magnetic composite with a two-dimensional magnetic moment of claim 4, wherein the artificial two-dimensional magnetic moment micropowder has a diameter-to-thickness ratio in a range of 50 to 150.

10. The soft magnetic composite with a two-dimensional magnetic moment of claim 4, wherein the intrinsic two-dimensional magnetic moment micropowder has a size of 5 μm or less.

* * * * *